June 18, 1968  L. AXTHAMMER ETAL  3,388,883
HYDROPNEUMATIC SUPPORT COLUMN OF ADJUSTABLE LENGTH
Filed Feb. 14, 1966  3 Sheets-Sheet 1
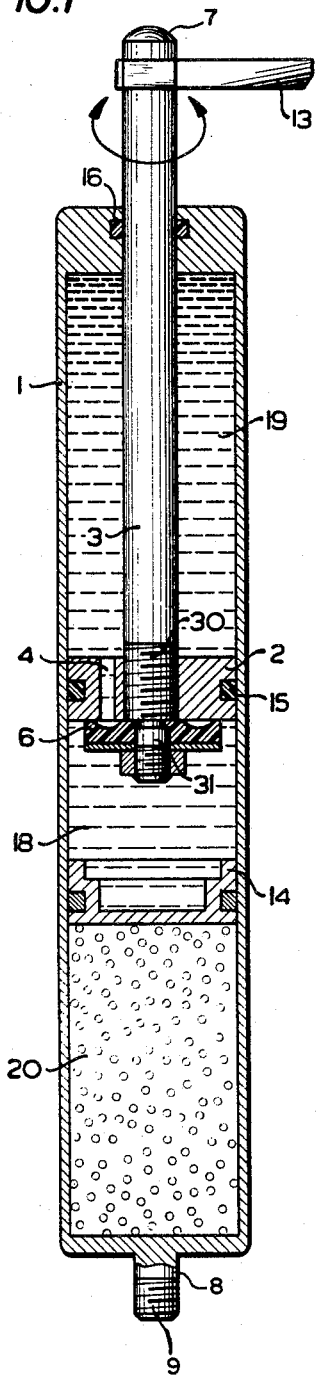
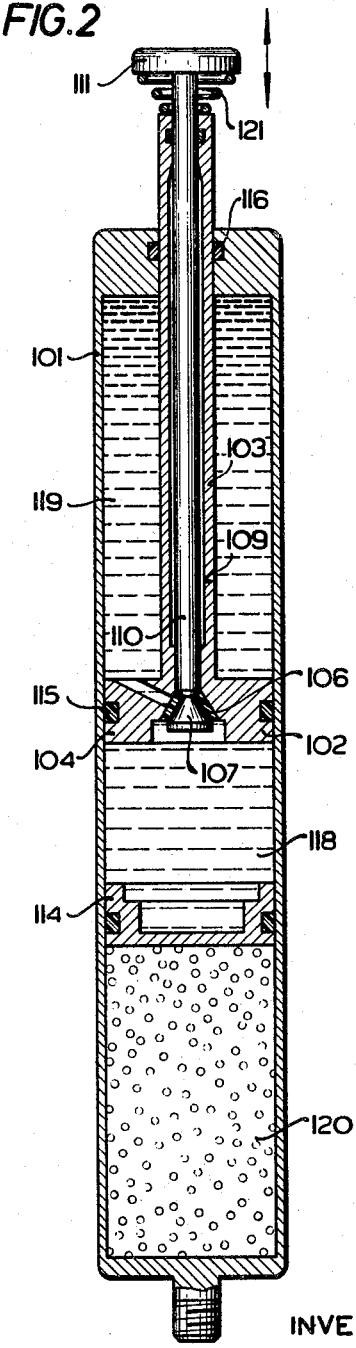
INVENTORS.
LUDWIG AXTHAMMER
FELIX WÖSSNER
BY: *Kew and Berman*
AGENTS

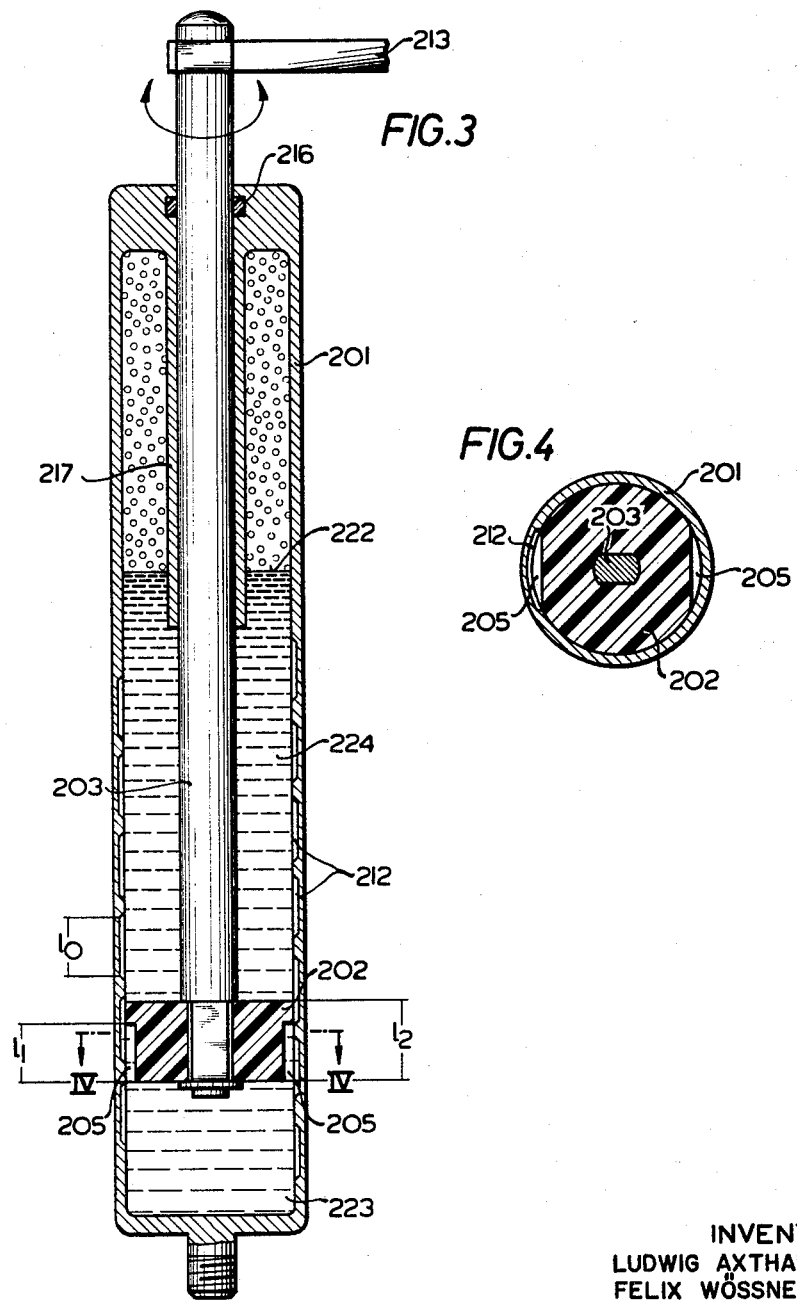

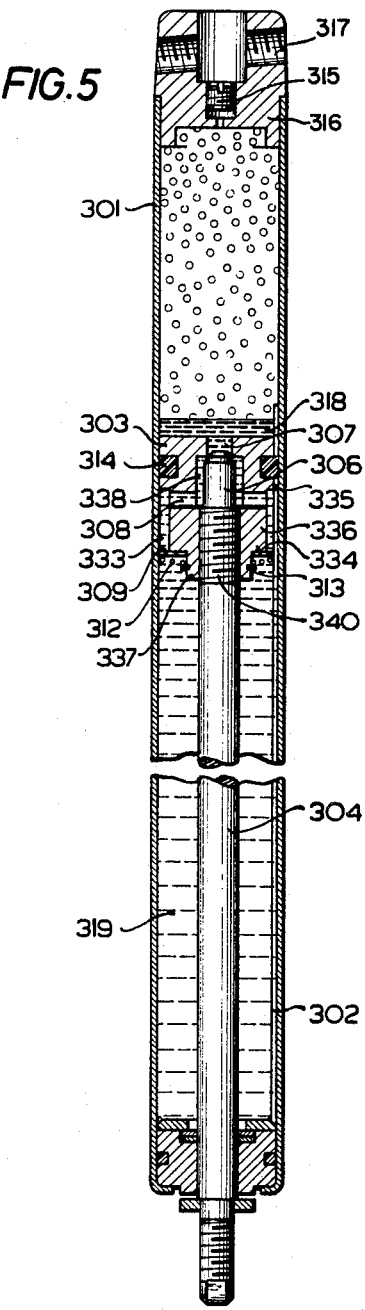
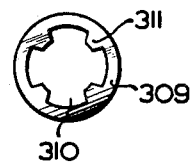

3,388,883
HYDROPNEUMATIC SUPPORT COLUMN OF ADJUSTABLE LENGTH
Ludwig Axthammer and Felix Wössner, Schweinfurt, Germany, assignors to Fichtel & Sachs A.G., Schweinfurt, Germany
Filed Feb. 14, 1966, Ser. No. 527,365
Claims priority, application Germany, Feb. 25, 1965, F 45,359/65; July 16, 1965, F 46,621/65
10 Claims. (Cl. 248—188.2)

ABSTRACT OF THE DISCLOSURE

A hydropneumatic support column having a cylinder, a piston in the cylinder whose piston rod projects from the cylinder, and engaging means on the piston rod and the cylinder for connecting the column to a load and to a support. A recess at least partly extending through the piston in the direction of the cylinder axis may be opened and closed by a valve operated from outside the cylinder to connect or separate two axial parts of the cylinder filled with liquid except for a gas cushion remote from the piston in one part.

---

This invention relates to support columns of adjustable length, such as adjustable legs for tables, chairs, and other pieces of furniture, and particularly to an extendable hydropneumatic column.

It is known to support tables, chairs, and other pieces of furniture on extendable columns which include a cylinder, a piston slidable in the cylinder, and means for securing the piston and cylinder to a table top, the seat of a chair, and the like. The cylinder is filled with liquid under the pressure of a body of gas, and the overall length of the device can be changed by opening a passage connecting the compartments of the cylinder above and below the piston to flow of the liquid.

The general object of this invention is the provision of an improved extendable column of the afore-described type. More specifically, the invention aims at providing a column the length of which can be changed by exerting relatively small axial forces on the piston and cylinder, the adjusted length of which can be fixed against forces exerted on the piston and cylinder in either axial direction, and which is still a simple device having a minimum of movable parts, and therefore capable of being manufactured at low cost, and having a long useful life without requiring maintenance operations. A particular goal of the invention is the provision of an extendable column of the type described in which the fluids contained in the cylinder may be held at a relatively low operating pressure without interfering with the normal operation of the column.

With these and other objects in view, the invention mainly resides in a column whose cylinder is formed with an axially elongated cavity adapted to enclose a fluid, the term "cylinder" as used herein, not necessarily being limited to a geometrical shape of circular cross section transversely of its axis. A piston slidable in the cavity in sealing engagement with the cylinder divides the cavity into two axial parts. A recess extends over at least a portion of the axial length of the piston. A valve arrangement is provided at the recess and may move between an open position in which it opens the recess to flow of fluid between the two parts of the cavity in both axial directions, and a closed position in which the recess is closed to axial fluid flow. A manually operable, single actuating member outside the cavity is operatively connected to the valve arrangement for moving the latter between the open and closed positions. Two securing devices at least partly outside the cylinder cavity are connected to the piston and cylinder respectively for axial movement toward and away from each other when the piston moves axially in the cylinder cavity.

Other features and many of the attendant advantages of this invention will be readily appreciated as the same becomes better understood by reference to the following detailed description of preferred embodiments when considered with the attached drawings in which:

FIG. 1 shows an extendable column of the invention in elevational section on its axis;

FIG. 2 illustrates another column of the invention in a corresponding view;

FIG. 3 shows a third embodiment of the invention in elevational sectional view;

FIG. 4 shows the device of FIG. 3 in plan section on the line IV—IV;

FIG. 5 illustrates yet another embodiment of the invention in a view corresponding to those of FIGS. 1, 2, and 3; and FIG. 6 shows a detail of the device of FIG. 5 in plan view.

Referring now to the drawing in detail, and initially to FIG. 1, there is seen a long and slender hollow cylinder 1 enclosing a cavity which is sealed except as specifically mentioned hereinafter. A piston 2 is axially slidable in the cylinder 1 and is equipped with a piston ring 15 which not only provides a seal between the cylinder 1 and piston 2, but also frictionally impedes relative rotation of piston and cylinder about the common axis.

The piston 2 is mounted on a piston rod 3 by means of engaged coaxial threads 30 on the piston 2 and rod 3. The piston rod passes through an end wall of the cylinder which axially bounds the cavity thereof in fluid-tight engagement with a packing 16. The free end of the rod 3 outside the cylinder 1 is covered by a rubber pad 7 having the shape of a spherical segment. Threads 9 of an axially projecting stud 8 on the opposite end of the cylinder 1 permit the stud to be engaged with a non-illustrated rubber cylinder. An arm or handle 13 radially extends from the rod 3 outside the cylinder 1 to permit the rod 3 to be rotated manually as indicated by an arrow.

Several recesses or bores 4 pass axially through the piston 2 at the same distance from the piston axis, only one bore 4 being visible in the drawing. The reduced end portion 31 of the rod 3 in the cylinder 1 carries a partly resilient annular disc 6 which is subjacent the piston 2 in the illustrated position of the device and constitutes a valve plug which blocks the lower orifices of the bores 4.

The piston 2 divides the cavity within the cylinder 1 into two axial parts, and the lower one of these parts is further divided into two sealed compartments by a floating seal or piston 14. The upper axial part 19 of the cylinder cavity and the compartment 18 of the lower part adjacent the piston 2 are filled completely, or as completely as possible, by a body of liquid such as oil or hydraulic fluid, and the compartment 20 under the floating piston 14 is filled with a gas, such as air or nitrogen, under a pressure higher than atmospheric pressure, and typically under about 20–25 atmospheres gage pressure, when the column is intended to support a load of about 100 kg.

When it is desired to change the length of the column shown in FIG. 1, the valve which blocks communication between the compartments 18 and 19 is opened by manually turning the rod 3 in such a direction that the piston 2 moves axially away from the disc 6. The pressure of the gas in the compartment 20 will then tend to move the rod 3 outward of the cylinder 1, and lengthening of the column is achieved by merely waiting until it reaches the desired length, and then blocking the recess or bore 4 by turning the rod 3. When it is desired to shorten the column, the piston rod 3 is pushed inward of the cylinder 1, and the bore 4 is then blocked. The force necessary for pushing the rod 3 against the resistance of the gas cushion in the compartment 20 is directly related to the cross sectional area of the rod 3 which may be quite small.

The relative position of the piston and cylinder is secured against axial compressive stresses mainly by the gas pressure in the compartment 20 which is applied to the relatively large radial face of the piston 2. Expansion of the column under tensile axial stresses is limited to virtually zero by the low compressibility of the liquid in the compartment 19 as long as the packing 16, the valve disc 6, and the piston ring 15 provide tight seals.

The column is normally interposed between a supported load, such as a table top, engaging the pad 7, while the rubber cylinder (not shown) on the threads 9 engages the floor. The column is held in position mainly by the weight of the supported load, and lateral slipping is prevented by friction between rubber elements and the engaged surfaces. Obviously, other means for engaging the column with a load and a supporting floor or base may be provided in a conventional manner.

The modified column shown in FIG. 2 has a cylinder 101, a piston 102 equipped with a piston ring 115, a floating seal or piston 114, a piston rod 103 movably sealed by a packing 116 to a transverse wall of the cylinder 101, the cylinder being divided into three compartments by the piston 102 and the floating seal 114, the compartments 118, 119 being liquid-filled, and the compartment 120 holding a cushion of compressed gas, the arrangement being generally similar in structure and function to that described above with reference to FIG. 1.

The piston rod 103 is fixedly fastened to or integral with the piston 102, and is provided with an axial bore 109 dimensioned for movable guiding engagement of the inner wall of the rod 103 near its ends with a round bar 110. The lower end of the bar 110 carries a valve member 107 which tapers conically in a upward axial direction and is received in a downwardly open recess of the piston 102 which has a conical valve seat portion 106 provided with a resilient facing, the valve member 107 moving toward and away from the valve seat 106 when the bar 110 moves axially in the bore 109.

The valve member 107 is normally held in sealing engagement with the valve seat 106 by a compression spring 121 interposed between the top of the rod 103 and a knob 111 on the top end of the bar 110. The knob serves as an actuating member for axially shifting the bar 110 and may also serve as an engaging means for connecting the column to a supported load. A bore 104 passing through the piston 102 has respective orifices in the top face of the piston 102 in the compartment 119 and the valve seat 106.

The apparatus shown in FIG. 2 operates substantially as described above with reference to FIG. 1, the length of the column being fixed as long as the valve member 107 engages the valve seat 106 and blocks the bore or recess 104. The valve is opened to permit flow of liquid through the bore 104 by depressing the knob 111.

The column illustrated in FIGS. 3 and 4 is a particularly simple and rugged apparatus. Its external appearance is substantially identical with that of the column described with reference to FIG. 1, a piston rod 203 carrying a handle 213 projecting from an otherwise closed cylinder 201. The cavity within the cylinder is divided into only two compartments 223, 224 by a piston 202 fixedly fastened to the rod 203. Approximately one axial third of the cylinder cavity in the compartment 224 is filled with a compressed gas, whereas the remainder of the compartment 224 and the compartment 223 are filled with liquid.

A sleeve 217 coaxially envelops the portion of the rod 203 nearest the top wall of the cylinder 201 to which the sleeve 217 is integrally attached. The sleeve 217 extends axially through the gas cushion in the cylinder and terminates slightly below the gas-liquid interface 222. Although the gas cushion is arranged near the top of the cylinder in the device shown in FIG. 3, the annular packing 216 which movably seals the rod 203 to the cylinder 201 need only be liquid-tight, and need not be gas-tight.

The portion of the inner cylinder wall below the lower end of the sleeve 217 has two rows of axially spaced shallow grooves 212, each groove extending approximately about one eighth of the cylinder circumference, the two rows being arranged diametrically opposite each other. All grooves are identical in size and shape, but the grooves of one row are axially offset from those of the other row by about one half of the axial length $l_0$ of a groove.

The piston 202 has two integral axial portions of which the smaller upper portion is cylindrical whereas the lower portion has two shallow, segment-shaped recesses 205 diametrically spaced from each other, and having each an axial length $l_1$ which is shorter than the corresponding dimension $l_2$ of the piston 202. The circumferential dimension of each recess 205 is approximately equal to that of the grooves 212. The axial dimensions of the grooves 212, the piston 202 as a whole, and of the recesses 205 are such that $l_0$ and $l_1$ are approximately equal and smaller than $l_2$ but substantially greater than one half of $l_2$, and $l_2$ is smaller than the combined axial lengths of the two grooves $2 \times l_1$ and of the axial spacing of the two grooves. The grooves 212 of the two rows axially overlap each other.

Because of these relationships, communication between the compartments 223 and 224 is established whenever the recesses 205 are angularly aligned with the two rows of grooves 212. At least one of the grooves 212 provides a by-pass about the cylindrical portion of the piston 202 into an associated recess 205 as is evident from FIG. 3. When the piston 202 is turned about 90° from the illustrated position, the cylindrical piston portion axially seals the recesses 205 and blocks flow of liquid from the compartment 223 through the axially open end of the recesses 205 into the compartment 224. Liquid can flow from a recess 205 toward the compartment 224 only by radial discharge into a groove 212, the grooves and the cylindrical piston portion thus constituting elements of a valve arrangement which controls the lengthening or shortening of the column.

An additional extendable column of the invention is shown in FIGS. 5 and 6. The cavity of a cylinder 301 is divided into two compartments 318, 319 by a piston 303 of stepped cylindrical shape. A piston rod 304 extends downward from the piston 303 and outward of the cylinder 301. The lower compartment 319 and the portion of the upper compartment 318 near the piston 303 are filled with liquid, a compressed gas occupying the remainder of the compartment 318. An axial guide rib 302 on the inner wall of the cylinder 301 engages a corresponding groove 335 in the cylinder 303 and prevents relative rotation of the piston and cylinder.

An axial bore 338 through the piston 303 has a threaded lower portion 340 in which a corresponding threaded portion of the piston rod 304 is received. A reduced portion 306 of the rod 304 next to the threaded portion terminates in a conical plug which engages a valve seat formed by an internal shoulder of the piston 303 in the bore 338 about the top orifice 307 of the bore.

Two radial bores 308 lead outward of the annular chamber defined in the bore 338 by the rod portion 306 into an annular duct 333 between a reduced central portion 336 of the piston 303 and the inner wall of the cylinder 301. Axial flow of liquid into and out of the duct is controlled by a throttling device which includes a flat annular washer 309 best seen in FIG. 6. Four circumferentially spaced radial projections 311 on the inner circumference of the washer define recesses 310 therebetween.

The washer 309 is urged against a radial, annular seating face 334 on the piston portion 336 by a spiral spring 312 which abuts against a retainer ring 313 on the axially lowermost portion 337 of the piston 303.

A threaded plug 315 normally closes an axial passage through the top wall 316 of the cylinder 301 which permits the cylinder to be charged with liquid and gas, and it will be understood that the embodiments of the invention shown in FIGS. 1 to 4 are similarly equipped with filling nipples or the like for admitting or replenishing their charge of gas and liquid in a non-illustrated conventional manner.

The portion of the rod 304 which projects from the cylinder 301 is threaded for engagement with a supporting base, and the flat radial top face of the cylinder 301 may engage a supported load. A threaded bore 317 in the top portion of the cylinder 301 permits the insertion of a non-illustrated bar transverse to the cylinder axis for rotating the cylinder relative to the piston rod 304.

The length of the column shown in FIG. 5 is normally fixed, and can be changed only when liquid is capable of flowing between the compartments 318, 319 through the afore-described bores and other recesses of the piston 303. When the cylinder 301 is turned about its axis relative to the rod 304, the piston 303 threadedly moves in the piston 304 so that the valve seat about the orifice 307 may move away from the valve plug 306. The pressure of the gas in the compartment 318 then tends to expel the piston rod 304 from the cylinder 301, thereby to lengthen the column. If the gas pressure is high, as needed with columns supporting very heavy loads, the lengthening movement of the piston rod 304 could become very rapid, and could not be stopped quickly enough by rotation of the cylinder 301 for attaining a precise desired length of the column in the absence of the throttling device described above.

Liquid flows axially upward through the piston 303 when the rod 304 moves outward of the cylinder 301, and such upward flow is selectively or preferentially throttled by the washer 309. The projections 311 of the washer 309 are held in contact with the seating face 334 of the piston 303 partly by the spring 312 and mainly by the pressure of the flowing liquid. The continuous annular rim of the washer blocks most of the duct 333, and liquid can flow upward only through narrow portions of the recesses 310 which extend radially outward beyond the seating face 334. The washer is readily lifted from the seating face 334 against the restraint of the spring 312 by downwardly flowing liquid when axial pressure is brought to bear on the cylinder 301 and piston rod 304 to push the rod inward of the cylinder. The throttling device, therefore, does not interfere with manual shortening of the column.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. An extendable column comprising, in combination:
   (a) a cylinder member having an axis and formed with an axially elongated cavity adapted to enclose a fluid;
   (b) a piston member slidable in said cavity in sealing engagement with said cylinder member and axially dividing said cavity into two parts,
       (1) said piston member being formed with a recess axially extending through at least a portion of said piston member;
   (c) valve means at said recess movable between an open position in which said valve means connects said parts of said cavity through said recess for flow of fluid between said parts in both axial directions and a closed position in which said recess is closed to said axial fluid flow;
   (d) a manually operable, single actuating element outside said cavity;
   (e) connecting means operatively connecting said actuating element to said valve means for moving the valve means between said positions thereof in response to movement of said actuating element;
   (f) two engaging means for respectively engaging said members with a load and with a support, said engaging means being at least partly outside said cavity and operatively connected to said members respectively for axial movement of said engaging means toward and away from each other when said piston member axially moves in said cavity;
   (g) a body of liquid in said cavity substantially filling one of said parts and occupying a portion of the other part adjacent said piston member; and
   (h) a body of gas under pressure higher than atmospheric pressure, said body of gas substantially filling the remainder of said other part remote from said piston member.

2. A column as set forth in claim 1, further comprising means interposed between said piston member and said cylinder member for impeding relative rotation thereof about said axis, said connecting means including an axially extending rod member connected to said actuating element for joint rotation about said axis, and motion transmitting means responsive to said rotation for moving said valve means axially between said positions thereof.

3. A column as set forth in claim 2, wherein said valve means include a plug portion on said rod member, and a valve seat portion on said piston member, said motion transmitting means connecting said rod member to said piston member for axial movement relative to each other responsive to said rotation, said recess passing through said piston member and having an orifice in said valve seat portion.

4. A column as set forth in claim 1, wherein said engaging means include a hollow, axial rod member attached to said piston member and extending outward of said cavity, said valve means including a valve seat portion on said piston member and a plug portion, said connecting means including a bar member axially slidable in said rod member, said plug portion and said actuating element being attached to said bar member.

5. A column as set forth in claim 1, wherein said cylinder member has an axial internal wall formed with a plurality of axially spaced by-pass grooves, and said recess being axially open toward one of said parts of the cavity and radially outward toward said wall, a portion of said piston member sealing said recess from the other part of said cavity, said portion of the piston member and said grooves constituting elements of said valve means, one of said grooves communicating with said recess and axially by-passing said portion of the piston member in the open position of the valve means, said connecting means connecting said actuating element to said piston member for angularly moving the same toward and away from a position of radial communication between said recess and said groove.

6. A column as set forth in claim 5, wherein said grooves are aligned in two axial rows spaced from each other at a predetermined angle relative to said axis, the piston member being formed with a second axially extending recess spaced from said first-mentioned recess at said predetermined angle relative to said axis, said second recess being axially open toward one of the parts of the cavity and radially open toward said wall, said portion of the piston member axially sealing said second recess, the grooves of said two rows being of substantially identical axial length and axially offset relative to each other.

7. A column as set forth in claim 1, wherein said cylinder member has an axial internal wall formed with a plurality of axially spaced by-pass grooves, said recess being radially open toward said wall over an axial distance greater than the spacing of said grooves, the combined axial length of two axially adjacent grooves and of the spacing thereof being greater than the axial dimension of said piston member.

8. A column as set forth in claim 1, wherein said valve means include throttling means effective in said open position of said valve means for preferentially throttling the flow of fluid through said recess in one of said axial directions.

9. A column as set forth in claim 8, wherein said piston member has a seating face adjacent said recess, and said throttling means include a throttling member movable in the two directions of liquid flow toward and away from a position in which said throttling member abuttingly engages said seating face and obstructs a major portion of said recess, and yieldably resilient means biasing said throttling member toward said position.

10. A column as set forth in claim 1, wherein said engaging means include a rod member attached to said piston member, said cylinder member axially closing said other part of the cavity having a wall, and said rod member movably passing through said wall, the column further comprising a tubular member attached to said wall in said cavity and enveloping a portion of said rod member, said tubular member axially passing through said body of gas and entering said body of liquid.

References Cited

UNITED STATES PATENTS

| 446,426 | 2/1891 | Bryon | 188—21 |
| 2,042,443 | 5/1936 | Buckstone | 248—411 |
| 3,236,515 | 2/1966 | Ackerman | 267—71 |

FOREIGN PATENTS

| 164,842 | 8/1955 | Australia. |
| 1,110,471 | 7/1961 | Germany. |
| 916,936 | 1/1963 | Great Britain. |

CHANCELLOR E. HARRIS, *Primary Examiner.*